(12) United States Patent
Umeyama et al.

(10) Patent No.: US 10,340,502 B2
(45) Date of Patent: Jul. 2, 2019

(54) SECONDARY BATTERY AND MANUFACTURING METHOD OF SECONDARY BATTERY

(71) Applicant: TOYOTA JIDOSHA KABUSHIKI KAISHA, Toyota-shi, Aichi-ken (JP)

(72) Inventors: Hiroya Umeyama, Okazaki (JP); Yukinobu Miyamura, Osaka (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 226 days.

(21) Appl. No.: 15/311,866

(22) PCT Filed: May 18, 2015

(86) PCT No.: PCT/IB2015/000705
§ 371 (c)(1),
(2) Date: Nov. 17, 2016

(87) PCT Pub. No.: WO2015/177621
PCT Pub. Date: Nov. 26, 2015

(65) Prior Publication Data
US 2017/0104202 A1    Apr. 13, 2017

(30) Foreign Application Priority Data
May 19, 2014    (JP) ................................ 2014-103332

(51) Int. Cl.
*H01M 2/34* (2006.01)
*H01M 2/26* (2006.01)
*H01M 10/04* (2006.01)

(52) U.S. Cl.
CPC ............. *H01M 2/345* (2013.01); *H01M 2/26* (2013.01); *H01M 10/0431* (2013.01); *H01M 10/04* (2013.01); *H01M 2200/20* (2013.01)

(58) Field of Classification Search
CPC . H01M 2/345; H01M 10/0431; H01M 220/20
(Continued)

(56) References Cited

U.S. PATENT DOCUMENTS

| | | |
|---|---|---|
| 2008/0038627 A1 | 2/2008 | Yamauchi et al. |
| 2013/0196192 A1 | 8/2013 | Harada et al. |

(Continued)

FOREIGN PATENT DOCUMENTS

| | | |
|---|---|---|
| CN | 103227311 A | 7/2013 |
| JP | 2008-066254 A | 3/2008 |

(Continued)

*Primary Examiner* — Amanda C. Walke
(74) *Attorney, Agent, or Firm* — Sughrue Mion, PLLC (57) ABSTRACT

A secondary battery includes a scaling body (25), a rivet member (30), a gasket (27) that contacts the rivet member (30) and is fixed between the sealing body (25) and the rivet member (30), a holder member (60), a reversing plate (40) that deforms when an internal pressure of the exterior body (10) rises, and a heat accumulation portion (70) that contacts the rivet member (30) and has a higher thermal conductivity than the rivet member (30). An outer peripheral edge (42) of the reversing plate (40) is connected by welding to the peripheral edge portion (36) of the rivet member (30), and the heat accumulation portion (70) is sandwiched between the opposing portion (33) of the rivet member (30) and the extending portion (61) of the holder member (60).

6 Claims, 7 Drawing Sheets

(58) Field of Classification Search
USPC ............................................................ 429/61
See application file for complete search history.

(56) References Cited

U.S. PATENT DOCUMENTS

| | | |
|---|---|---|
| 2014/0113163 A1 | 4/2014 | Nagata et al. |
| 2015/0243960 A1* | 8/2015 | Imanishi ............... H01M 2/345 |
| | | 429/61 |
| 2015/0295221 A1* | 10/2015 | Urano .................... H01M 2/22 |
| | | 429/61 |

FOREIGN PATENT DOCUMENTS

| | | |
|---|---|---|
| JP | 2011076855 A | 4/2011 |
| JP | 2013157156 A | 8/2013 |

* cited by examiner

| | SHAPE | | | | | RESULTS |
|---|---|---|---|---|---|---|
| | INSIDE DIAMETER D1 (mm) | OUTSIDE DIAMETER D2 (mm) | THICKNESS T1 (mm) | VOLUME (mm$^3$) | MATERIAL | TEMPERATURE (°C) |
| COMPARATIVE EXAMPLE 1a | – | – | – | – | – | 160 |
| COMPARATIVE EXAMPLE 2a | 8 | 16 | 0.5 | 75.4 | ALUMINUM | 138 |
| COMPARATIVE EXAMPLE 3a | 8 | 12 | 1.0 | 62.8 | ALUMINUM | 140 |
| COMPARATIVE EXAMPLE 4a | 12 | 16 | 1.0 | 87.9 | ALUMINUM | 132 |
| EXAMPLE 1 | 8 | 16 | 1.0 | 150.7 | ALUMINUM | 120 |
| EXAMPLE 2 | 8 | 16 | 1.5 | 226.1 | ALUMINUM | 108 |
| EXAMPLE 3 | 8 | 16 | 2.0 | 301.4 | ALUMINUM | 98 |
| EXAMPLE 4 | 8 | 18 | 1.0 | 204.1 | ALUMINUM | 111 |
| EXAMPLE 5 | 8 | 18 | 2.0 | 408.4 | ALUMINUM | 91 |
| EXAMPLE 6 | 10 | 18 | 1.0 | 175.8 | ALUMINUM | 114 |
| EXAMPLE 7 | 8 | 14 | 1.5 | 155.4 | ALUMINUM | 119 |
| EXAMPLE 8 | 8 | 16 | 1.0 | 150.7 | COPPER | 92 |
| EXAMPLE 9 | 8 | 16 | 1.0 | 150.7 | IRON | 105 |
| EXAMPLE 10 | 8 | 16 | 1.0 | 150.7 | CARBON | 110 |

FIG. 13

SECONDARY BATTERY AND MANUFACTURING METHOD OF SECONDARY BATTERY

BACKGROUND OF THE INVENTION

1. Field of the Invention

The invention relates to a secondary battery provided with a current interrupt device, and a manufacturing method of this secondary battery.

2. Description of Related Art

A secondary battery described in Japanese Patent Application Publication No. 2008-66254 (JP 2008-66254 A) is provided with a current interrupt device. A current path is interrupted by interrupting foil that forms a portion of the current path breaking when a diaphragm deforms by a predetermined amount or more in response to internal pressure of an exterior body.

When manufacturing the secondary battery described in JP 2008-66254 A, an external terminal, a gasket, a sealing body, an insulation holder, and a sealing lead are overlapped in this order from a side that will be on the outside in the exterior body. One end side that is positioned inside of the exterior body, of the external terminal that has been inserted through a through-hole formed in the sealing body is crimped. As a result, the gasket is fixed compressed between the external terminal and the sealing body, and the insulation holder is fixed compressed between the sealing body and the sealing lead. In this state, the diaphragm is laser welded to a peripheral edge portion of the sealing lead.

Here, in the secondary battery described in JP 2008-66254 A, a metal member with relatively high thermal conductivity such as aluminum is used as the sealing lead and the external terminal, and a resin member with relatively low thermal conductivity and good insulating properties such as polyether ether ketone is used as the insulation holder member. Therefore, heat generated when welding the diaphragm to the sealing lead is transferred to the gasket via a rivet member and the external terminal.

If excessive heat is transferred to the gasket, the temperature of the gasket will exceed a glass transition point of the material of the gasket, and the gasket will rupture or deform, reducing the sealability of the inside of the exterior body. Also, the elasticity of the gasket may decrease from the effect of the heat, which may result in the external terminal, the sealing lead, and the holder member and the like rattling and vibrating. This rattling may unintentionally cause a break in the current path. If the performance of the gasket that keeps the inside of the exterior body airtight decreases, the reliability of the secondary battery will suffer.

SUMMARY OF THE INVENTION

The invention thus provides a secondary battery capable of reducing heat transferred to a gasket that keeps the inside of an exterior body airtight, and thus improves reliability, as well as a manufacturing method of this secondary battery.

A first aspect of the invention relates to a secondary battery provided with a reversing plate that is connected to a rivet member and a collector member, and deforms when an internal pressure of an exterior body rises, a gasket that thermally contacts the rivet member, and is fixed in a state compressed and deformed between a sealing body and the rivet member; and a heat accumulation portion that thermally contacts the rivet member and has a thermal conductivity equal to or greater than the thermal conductivity of the rivet member. An outer peripheral edge of the reversing plate is connected by welding to a peripheral edge portion of the rivet member, and the heat accumulation portion is sandwiched between an opposing portion of the rivet member and an extending portion of a holder member.

A second aspect of the invention relates to a secondary battery that includes a battery element, an exterior body within which the battery element is housed, a sealing body that is arranged in an open portion provided in the exterior body, a collector member that is connected to the battery element, an electrically conductive rivet member, a gasket that contacts the rivet member and is provided between the sealing body and the rivet member, an electrically conductive reversing plate that is connected to the rivet member and the collector member, and deforms away from the collector member and toward the rivet member when an internal pressure of the exterior body rises, a thermal conduction amount suppressing portion that is provided between a connecting portion of the reversing plate and the rivet member, and a contact portion of the rivet member and the gasket, and suppresses an amount of heat transferred from the connecting portion to the contact portion, and an insulating portion that insulates the gasket from the thermal conduction amount suppressing portion.

According to the structure of the first or the second aspect described above, heat generated when the reversing plate is welded to the rivet member is accumulated in the heat accumulation portion, so the amount of heat that is transferred to the gasket via the rivet member is able to be reduced. As a result, the gasket is able to be inhibited from rupturing or deforming, so the sealability of the inside of the exterior body is able to be maintained. Further, rattling of the holder member due to deformation of the gasket is able to be suppressed, so the current interrupt device is able to be inhibited from erroneously activating, and thus the reliability of the secondary battery is able to be improved.

A third aspect of the invention relates to a manufacturing method of a secondary battery. In a step of welding a reversing plate in this manufacturing method, an outer peripheral edge of the reversing plate is welded to the peripheral edge portion of the rivet member, while the gasket is thermally contacting the rivet member, and the heat accumulation portion that has a thermal conductivity equal to or greater than the thermal conductivity of the rivet member is sandwiched between an opposing portion of the rivet member and an extending portion of the holder member such that the heat accumulation portion thermally contacts the rivet member.

A fourth aspect of the invention relates to a manufacturing method of a secondary battery that includes inserting a rivet member through a through-hole of a sealing body that is a lid of the secondary battery, such that the gasket is arranged between the sealing body and the rivet member, and welding a reversing plate that deforms away from a collector member and toward the rivet member when an internal pressure of the secondary battery rises, to the rivet member. This manufacturing method includes providing a thermal conduction amount suppressing portion that suppresses an amount of heat transferred from a weld of the reversing plate and the rivet member to a contact portion of the rivet member and the gasket, between the weld and the contact portion, before welding the reversing plate to the rivet member.

Using the manufacturing method of the third or fourth aspect described above enables heat generated when welding the reversing plate to the rivet member to be accumulated in the heat accumulation portion, so the amount of heat that is transferred to the gasket via the rivet member is able to be reduced. As a result, the gasket is able to be inhibited from rupturing or deforming, so the sealability of the inside of the exterior body is able to be maintained. Further, rattling of the holder member due to deformation of the gasket is able to be suppressed, so the current interrupt device is able to be inhibited from erroneously activating. As a result, a secondary battery with improved reliability is able to be manufactured.

According to this secondary battery and the manufacturing method of a secondary battery, it is possible to provide a secondary battery capable of reducing the amount of heat that is transferred to a gasket that keeps the inside of an exterior body airtight, and thus improve reliability, and a manufacturing method of this secondary battery.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, example embodiments of the invention will be described in detail with reference to the accompanying drawings. In the example embodiments described below, similar or common portions will be denoted by like reference characters in the drawings, and descriptions of these portions will not be repeated.

(Structure of the Secondary Battery)

A secondary battery 100 according to one example embodiment of the invention will be described with reference to FIGS. 1 to 3. The secondary battery 100 includes an exterior body 10, an electrode body 13 (FIG. 2), a negative external terminal 20 and collector 50 (FIG. 2), and a positive external terminal 24 and collector 51 (FIG. 2). The exterior body 10 includes a closed-end angular tube-shaped housing portion 15, and a sealing body 25 (a lid of the secondary battery) that seals an open portion 16 (FIG. 3) of the housing portion 15. An electrode body 13 (a battery element) is housed inside of the exterior body 10. The external terminals 20 and 24 are attached to the sealing body 25 of the exterior body 10.

The electrode body 13 has a positive core body, a negative core body, and a separator, none of which are shown. The positive core body and the negative core body are wound via the separator. A negative core body exposed portion 11 is provided on one end of the electrode body 13, and a positive core body exposed portion 12 is provided on the other end of the electrode body 13.

The negative core body exposed portion 11 is electrically connected to the external terminal 20 via the collector 50 and a connecting terminal. The positive core body exposed portion 12 is electrically connected to the external terminal 24 via the collector 51 and a Current Interrupt Device (CID) that will be described later.

Figure 1:
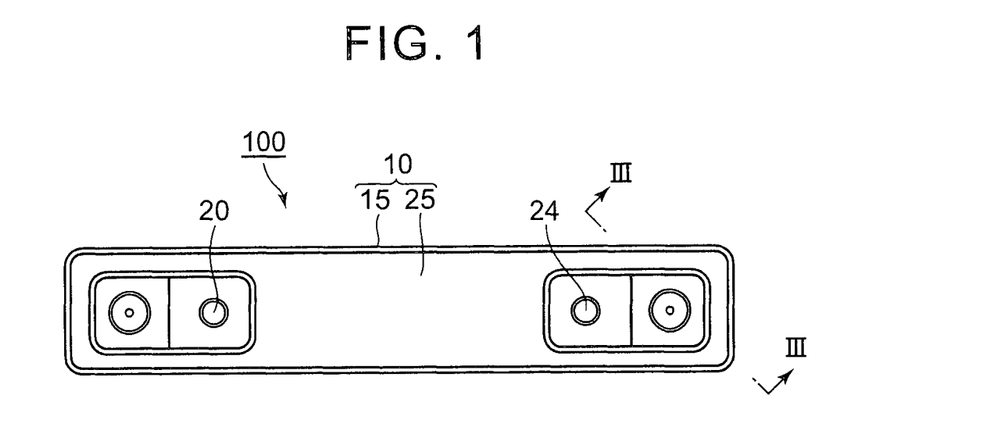
FIG. 1 is a plan view of a secondary battery according to an example embodiment of the invention.
Figure 2:
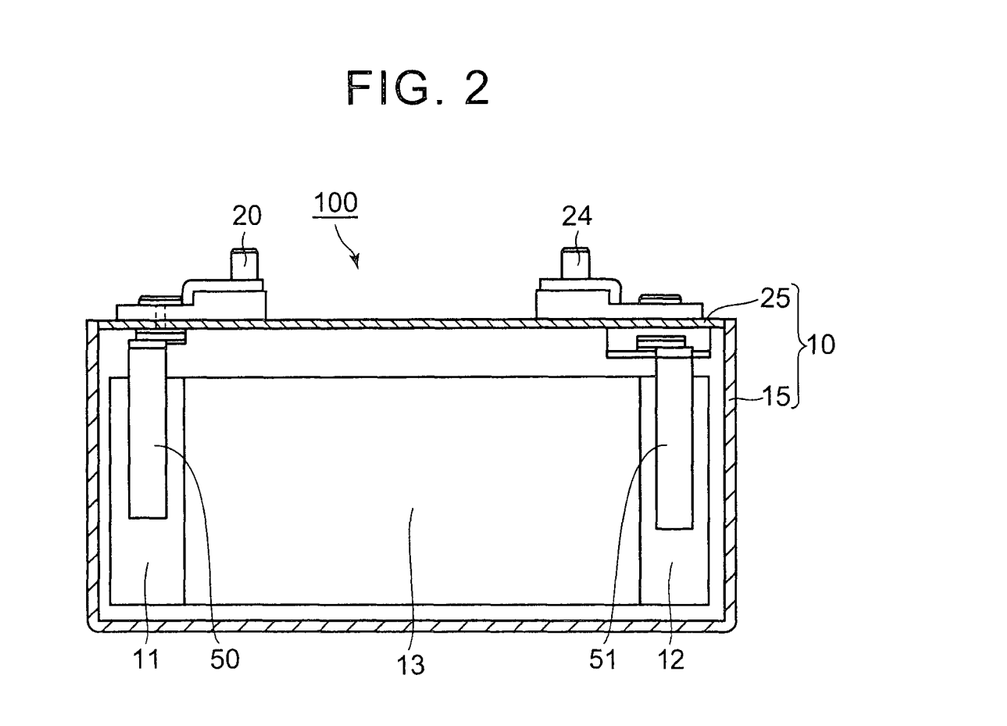
FIG. 2 is a sectional view of the secondary battery according to the example embodiment of the invention.
Figure 3:
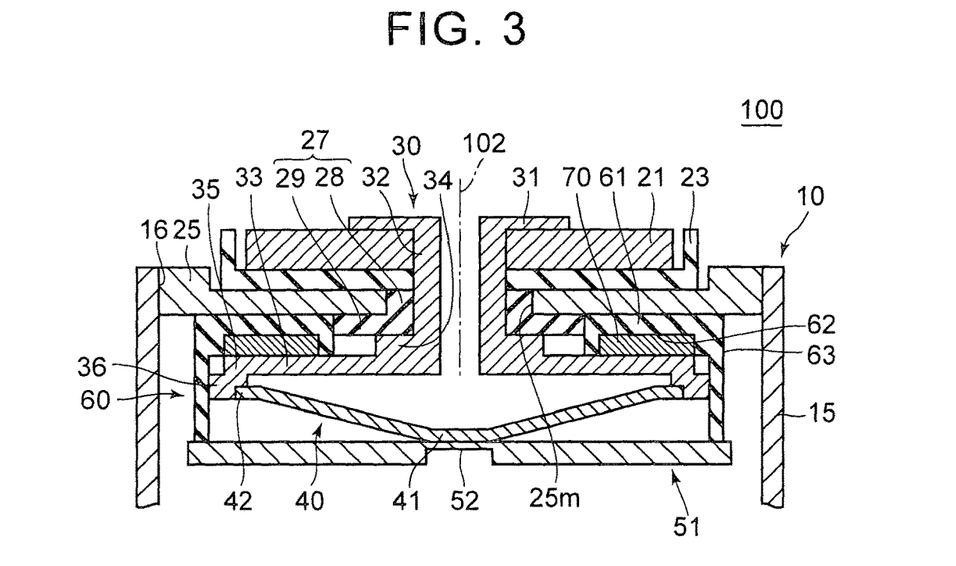
FIG. 3 is a sectional view taken along line III-III in FIG. 1.

FIG. 3 is a sectional view taken along line III-III in FIG. 1. As shown in FIGS. 1 to 3, the secondary battery 100 also includes a conductive plate 21, an insulator 23, a gasket 27, the sealing body 25, a rivet member 30, a reversing plate 40, the collector 51, and a holder member 60.

The sealing body 25 has a flat plate shape. The sealing body 25 is provided blocking the open portion 16 provided in the exterior body 10. A through-hole 25m is formed in the sealing body 25. This through-hole 25m is formed to communicate a space inside of the exterior body 10 with a space outside of the exterior body 10.

The insulator 23 is provided on an outer portion of the exterior body 10. The insulator 23 is lies directly on top of the sealing body 25. The insulator 23 is interposed between the sealing body 25 and the conductive plate 21. The insulator 23 is made of insulating material, and electrically insulates the sealing body 25 from the conductive plate 21.

The rivet member 30 is made of conductive material such as an aluminum alloy. The rivet member 30 is inserted through the through-hole 25m formed in the sealing body 25. The rivet member 30 is connected to the conductive plate 21 outside of the exterior body 10, and is connected to the reversing plate 40 inside of the exterior body 10. The rivet member 30 passes through the through-hole 25m provided in the sealing body 25, extends inside the exterior body 10, and is connected to the reversing plate 40. The rivet member 30 is electrically connected to the conductive plate 21. The rivet member 30 electrically connects the conductive plate 21 to the reversing plate 40. The conductive plate 21 is electrically connected to the external terminal 24 (FIG. 2).

The rivet member 30 includes a crimping portion 31, a small diameter portion 32, an opposing portion 33, a step portion 34, a large diameter portion 35, and a flange portion 36. The small diameter portion 32 has a shape that extends in a cylindrical manner centered on a virtual central axis 102. The crimping portion 31 is formed on the opposite of the small diameter portion 32 from the opposing portion 33. The crimping portion 31 is formed by crimping a tip end portion side of the small diameter portion 32 after the small diameter portion 32 has been inserted through the through-hole 25m. The conductive plate 21, the insulator 23, the sealing body 25, the gasket 27, the holder member 60, and a heat accumulation portion (heat accumulation member) 70 are fixed crimped between the crimping portion 31 and the opposing portion 33.

The opposing portion 33 has a generally discoid shape that extends radially outward toward the large diameter portion 35 from the small diameter portion 32. The opposing portion 33 faces the sealing body 25 from a distance inside the exterior body 10. The opposing portion 33 extends substantially parallel to the sealing body 25 inside the exterior body 10.

The step portion 34 is formed by a portion of the small diameter portion 32 protruding toward the outer peripheral side centered on the central axis 102. The step portion 34 is provided inside the exterior body 10. The step portion 34 is provided in a position away from the sealing body 25 that blocks the open portion 16 of the exterior body 10. A gap is formed between the step portion 34 and the sealing body 25. The gasket 27 that will be described later is arranged in this gap. The step portion 34 is provided on the end portion inside of the exterior body 10. The step portion 34 has a shape in which a surface that faces the crimping portion 31 on the innermost peripheral portion of the opposing portion 33 protrudes toward the crimping portion 31.

The large diameter portion 35 stands erect from the peripheral edge of the opposing portion 33 (is bent toward the collector 51) and has an overall annular shape. The flange portion 36 is a portion that is positioned on a peripheral edge of an end portion of the large diameter portion 35 that is positioned on the opposite side from the opposing portion 33. The flange portion 36 has an annular shape. The large diameter portion 35 and the flange portion 36 correspond to a peripheral edge portion that is positioned on a peripheral edge of the opposing portion 33 of the rivet member 30. The space to the inside of the opposing portion 33, the large diameter portion 35, and the flange portion 36 allows the reversing plate 40 that will be described later to reverse.

With the rivet member 30, an outside diameter of the flange portion 36 may be 19 mm, and a height from a lower end of the flange portion 36 to a tip end of the crimping portion 31 may be 8 mm, for example.

The gasket 27 is made of elastic resin material or rubber material, such as PFA (Perfluoroalkoxy Fluorine Resin) or EPDM (ethylene propylene diene rubber). The gasket 27 is provided contacting the rivet member 30. The gasket 27 is interposed between the sealing body 25 and the rivet member 30. As a result, the inside of the exterior body 10 is sealed airtight. The gasket 27 is provided as a seal between the sealing body 25 and the rivet member 30.

The gasket 27 has a cylindrical portion 28 and a flange portion 29. The cylindrical portion 28 is inserted through the through-hole 25m. The cylindrical portion 28 is provided contacting an inner peripheral surface of the sealing body 25 that defines the through-hole 25m, and an outer peripheral surface of the small diameter portion 32 of the rivet member 30. The flange portion 29 is provided extending from an end portion of the cylindrical portion 28 toward the outer peripheral side, centered on the central axis 102. The flange portion 29 is sandwiched between the sealing body 25 and the step portion 34. In this way, the gasket 27 thermally contacts the rivet member 30 (such that heat from the rivet member 30 is transferred to the gasket 27), and is fixed in a state compressed and deformed between the sealing body 25 and the rivet member 30.

The reversing plate 40 is made of conductive material. The reversing plate 40 has a thin plate shape that is circular when viewed from above. The reversing plate 40 has a shape that is recessed on the side facing the opposing portion 33, and protrudes on the side facing the collector 51. The reversing plate 40 is arranged between the opposing portion 33 and the collector 51. The reversing plate 40 has a center portion 41 (reversing portion) and an outer peripheral edge 42.

The center portion 41 of the reversing plate 40 is connected to a thin portion 52 of the collector 51 that will be described later, and the outer peripheral edge 42 of the reversing plate 40 is connected to the inside of the flange portion 36 of the rivet member 30. As a result, the reversing plate 40 electrically connects the rivet member 30 to the collector 51. The center portion 41 and the outer peripheral edge 42 of the reversing plate 40 are fixed to the collector 51 and the rivet member 30 by welding.

The holder member 60 is provided inside of the exterior body 10. The holder member 60 is arranged sandwiching the gasket 27 on a side opposite the through-hole 25m. The holder member 60 is provided directly below the sealing body 25. The holder member 60 is provided so that it surrounds, on the whole, a portion of the opposing portion 33 that is positioned on the side opposite the small diameter portion 32 side, the large diameter portion 35, and the flange portion 36. The holder member 60 is fixed sandwiched between the sealing body 25 and the opposing portion 33.

The holder member 60 is formed using insulating resin that is highly rigid and has excellent insulating properties, such as PPS (polyphenylene sulfide). The holder member 60 has an extending portion 61 and a body portion 63, as constituent portions. The body portion 63 is provided extending in a cylindrical shape from a position adjacent to the sealing body 25, in a direction away from the sealing body 25. The body portion 63 is provided surrounding the opposing portion 33 and the reversing plate 40. The opposing portion 33 and the reversing plate 40 are arranged in a space surrounded by the body portion 63.

The extending portion 61 is provided in a position adjacent to the sealing body 25. The extending portion 61 is provided extending from an end portion of the body portion 63 toward the inner peripheral side, centered on the central axis 102. That is, the extending portion 61 extends from the end portion of the body portion 63 toward the gasket 27. The extending portion 61 is positioned between the sealing body 25 and the opposing portion 33. The extending portion 61 has a groove 62 that opens toward the opposing portion 33 of the rivet member 30.

The outer dimensions of the holder member 60 may be such that the width is 23 mm and the depth is 21 mm, the height of the extending portion 61 of the holder member 60 is 2.5 mm, and the inside diameter of the extending portion 61 is 18 mm, for example. Also, the groove 62 is formed so as to fit in the extending portion 61, and the depth is equal to or less than 2.0 mm, for example.

The heat accumulation portion 70 is formed using metal material having excellent thermal conductivity such as aluminum, an aluminum alloy, copper, or iron, or carbon material having thermal conductivity equal to or greater than these. The heat accumulation portion 70 has a ring shape when viewed from above. The heat accumulation portion 70 may be of the same material as the rivet member 30. Also, the heat accumulation portion 70 may be made from material having a higher thermal conductivity than the thermal conductivity of the rivet member 30. The heat accumulation portion 70 may be made from inorganic material as long as the inorganic material has a higher thermal conductivity equal to or greater than the thermal conductivity of the rivet member 30. Also, the heat accumulation portion 70 may consist of a metal plate and a plate of inorganic material. Also, a volume specific heat of the heat accumulation portion 70 may be greater than the volume specific heat of the holder member 60. Further, the heat accumulation portion 70 of this example embodiment may have a heat resistance higher than that of the gasket 27. The heat accumulation portion 70 and a portion of the rivet member 30 that is directly below the heat accumulation portion 70 may be regarded as the thermal conduction amount suppressing portion.

When a volume specific heat of a first portion of the rivet member 30 that is on a side closer to the contact portion of the rivet member 30 and the gasket 27 than the thermal conduction amount suppressing portion is C1, a thickness of the first portion is T1, an average volume specific heat of the thermal conduction amount suppressing portion is C2, and a thickness of the thermal conduction amount suppressing portion is T2, C2T2 may also be greater than C1T1 (i.e., C2T2>C1T1).

The heat accumulation portion 70 is sandwiched between the opposing portion 33 of the rivet member 30, and the extending portion 61 of the holder member 60. The heat accumulation portion 70 has higher thermal conductivity (a smaller specific heat capacity) than the rivet member 30 does, and thermally contacts the rivet member 30 (i.e., contacts the rivet member 30 such that heat from the rivet member 30 is transferred to the heat accumulation portion 70).

According to this kind of structure, in a manufacturing process for manufacturing the secondary battery, which will be described later, heat generated when the reversing plate 40 is welded to the rivet member 30 accumulates in the heat accumulation portion 70. The heat accumulation portion 70 is insulated from the gasket 27 by the extending portion 61 of the holder member 60. Therefore, the amount of heat generated at the time of welding that is transferred to the gasket 27 via the rivet member 30 is able to be reduced.

Also, the heat accumulation portion 70 is formed by a disc spring that has elasticity, for example. The heat accumulation portion 70 is housed in the groove 62. The heat accumulation portion 70 urges the opposing portion 33 of the rivet member 30 in a direction away from the sealing body 25 while housed in the groove 62. As a result, the contact between the heat accumulation portion 70 and the rivet member 30 is able to be increased, so heat generated during welding described above is able to be efficiently transferred to the heat accumulation portion 70. As a result, the amount of heat that is transferred to the gasket 27 via the rivet member 30 is able to be even further reduced.

The collector 51 forms a contact point between the battery element and the current interrupt device, inside the exterior body 10. The collector 51 as a collector member is retained by the holder member 60 inside the exterior body 10. The collector 51 faces the opposing portion 33 of the rivet member 30 from a distance. The collector 51 is connected to the holder member 60 at a tip end of the body portion 63 that extends in a cylindrical manner in a direction away from the sealing body 25.

The collector 51 has a thin portion 52. The thickness of this thin portion 52 is thinner than the thickness of other portions because of a groove provided in the collector 51. A collector tab, not shown, is provided in a direction away from the sealing body 25, on the collector 51. This collector tab extends from the collector 51 and is connected to an electrode plate of the battery element. The collector 51 is electrically connected to the battery element via the collector tab. The thin portion 52 may also be formed by an interrupting film that blocks a through-hole formed in the collector 51.

(Operation of the Current Interrupt Device)

Referring to FIG. 3, the current interrupt device is formed by the collector 51, the reversing plate 40, and the rivet member 30. During normal use of the secondary battery 100 (FIG. 1) before the current interrupt device is activated, the reversing plate 40 has a shape in which the center portion 41 protrudes out toward the collector 51, and the collector 51 is electrically connected to the external terminal 20 (FIG. 1) via the reversing plate 40, the rivet member 30, and the conductive plate 21.

Before the current interrupt device is activated, current flows in order to the collector 51 (the thin portion 52), the reversing plate 40 (the center portion 41), and the rivet member 30. As a result, power is supplied from the secondary battery 100 to an external device. During charging, current flows in the reverse direction. When the internal pressure of the exterior body 10 (FIG. 1) rises, the center portion 41 of the reversing plate 40 is pressed by gas inside the exterior body 10. The internal pressure of the exterior body 10 is applied evenly to the center portion 41. The thin portion 52 of the collector 51 is less rigid than other portions (e.g., a thick portion) of the collector 51.

If the internal pressure of the exterior body 10 becomes higher than a set value (an activation pressure), the thin portion 52 will break, and the center portion 41 of the reversing plate 40 will separate from the broken thin portion 52 and the collector 51, and deform toward the opposing portion 33 of the rivet member 30. As a result, the collector 51 and the reversing plate 40 separate, so electrical conductivity is interrupted.

(Manufacturing Method)

Figure 4:
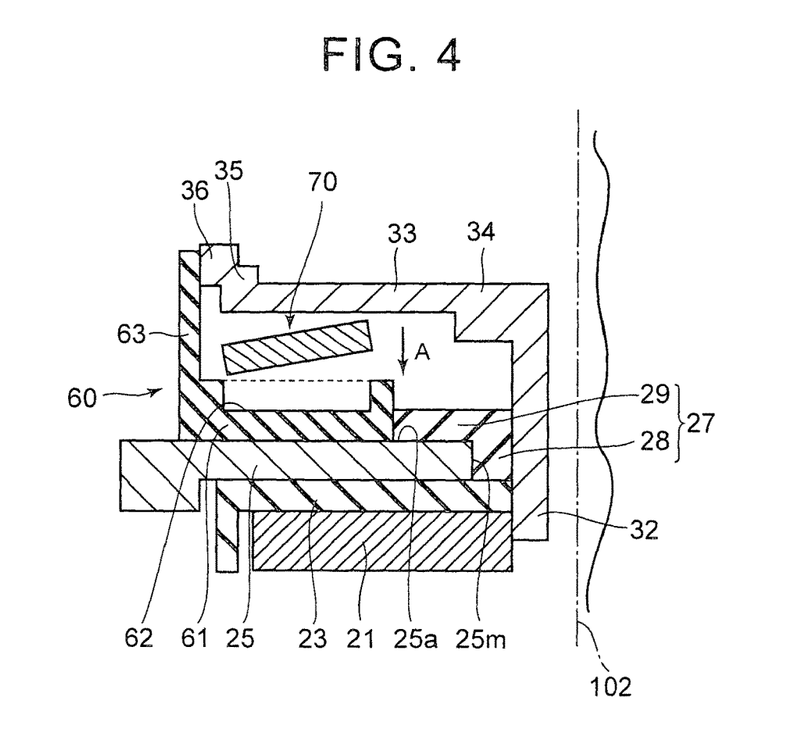
FIG. 4 is a view of a first step in a manufacturing method of the secondary battery according to the example embodiment of the invention.

A manufacturing method of the secondary battery according to the example embodiment will be described with reference to FIGS. 4 to 9. As shown in FIG. 4, when manufacturing the secondary battery according to the example embodiment, first the sealing body 25 that will be arranged in the open portion 16 provided in the exterior body 10 is prepared. Next, the conductive plate 21, the insulator 23, and the sealing body 25 are placed one on top of another in this order, from the side that will be the outside of the exterior body 10. At this time, the conductive plate 21, the insulator 23, and the sealing body 25 are overlapped in such a manner that the central axes 102 of these are aligned.

Continuing on, the gasket 27 and the holder member 60 are placed on a main surface 25a of the sealing body 25 that will face the inside of the exterior body 10. At this time, the holder member 60 is arranged sandwiching the gasket 27 on a side opposite the through-hole 25m. The gasket 27 is placed such that the cylindrical portion 28 contacts the inner peripheral surface of the sealing body 25 that defines the through-hole 25m, and the flange portion 29 contacts the main surface 25a of the sealing body 25. The holder member 60 is placed such that the extending portion 61 contacts the main surface 25a of the sealing body 25. The groove 62 faces the side opposite the side on which the sealing body 25 is positioned.

Next, the heat accumulation portion 70 is placed on a main surface of the holder member 60 that is arranged on the main surface 25a of the sealing body 25, which is a main surface that will face the inside of the exterior body 10. More specifically, the heat accumulation portion 70 is placed in the groove 62.

Figure 5:
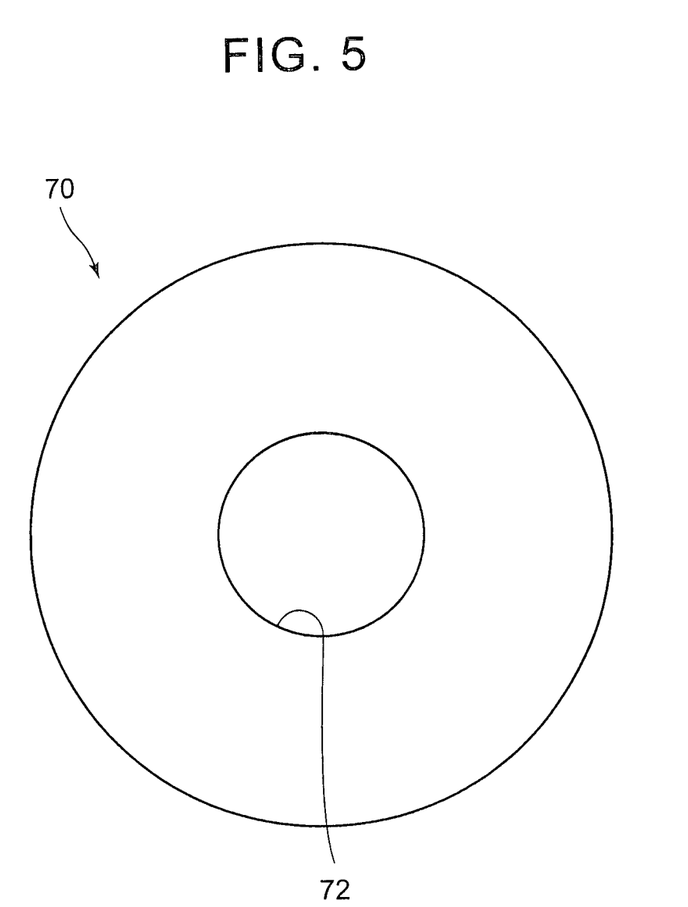
FIG. 5 is a plan view of a heat accumulation portion prepared in the first step shown in FIG. 4.
Figure 6:
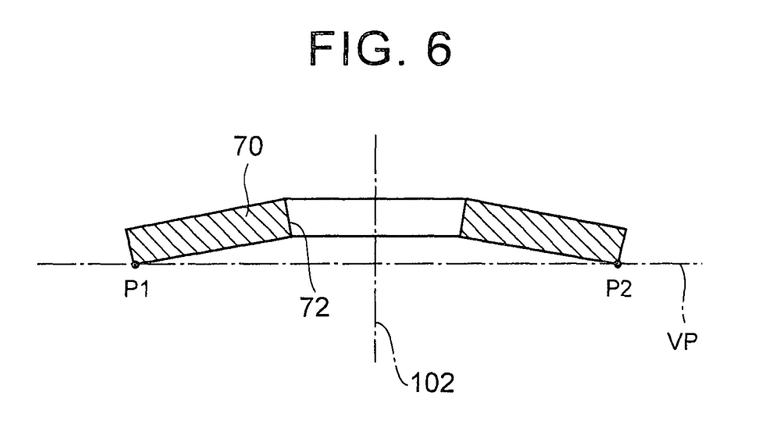
FIG. 6 is a sectional view of the heat accumulation portion prepared in the first step shown in FIG. 4.

As shown in FIGS. 5 and 6, the heat accumulation portion 70 has a hole 72 provided in the center portion, and thus has a ring shape when viewed from the extending direction of the central axis 102. The heat accumulation portion 70 is inclined away from a virtual plane VP that passes through outer peripheral ends P1 and P2, from the outer periphery toward the inner periphery. Therefore, when the heat accumulation portion 70 is placed in the groove 62, the heat accumulation portion 70 is inclined away from the bottom portion of the groove 62, from the outer periphery toward the inner periphery.

Continuing on, as the rivet member 30, a member in which a tip end of the small diameter portion 32 is not crimped is prepared. With the opposing portion 33 facing the extending portion 61 of the holder member 60 and the flange portion 29 of the gasket 27, a tip end (one end side of the rivet member 30) of the small diameter portion 32 that will be connected to the conductive plate 21 is inserted as shown by arrow A in FIG. 4 through the through-hole 25m provided in the sealing body 25, from the side on which the heat accumulation portion 70 is positioned. At this time, the tip end of the small diameter portion 32 is inserted through the through-hole 25m such that the outer peripheral surface of the small diameter portion 32 contacts the outer peripheral surface of the cylindrical portion 28 of the gasket 27.

Figure 7:
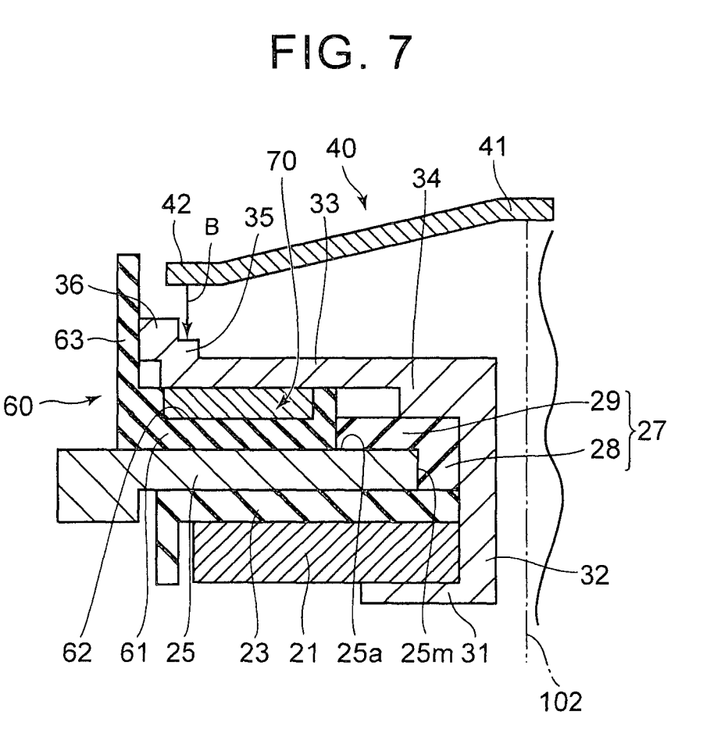
FIG. 7 is a view of a second step in the manufacturing method of the secondary battery according to the example embodiment of the invention.

As shown in FIG. 7, with the step portion 34 of the rivet member 30 contacting the flange portion 29 of the gasket 27, the tip end portion side of the small diameter portion 32 is crimped in a direction away from the central axis 102. As a result, the crimping portion 31 is formed, and the conductive plate 21, the insulator 23, the sealing body 25, the gasket 27, the holder member 60, and the heat accumulation portion 70 are fixed crimped between the crimping portion 31 and the opposing portion 33. In this way, the heat accumulation portion 70, the holder member 60, and the gasket 27 are fixed sandwiched between the rivet member 30 and the sealing body 25.

In this state, the gasket 27 thermally contacts the rivet member 30 (such that heat from the rivet member 30 is transferred to the gasket 27), and is fixed in a state compressed and deformed between the sealing body 25 and the rivet member 30. The heat accumulation portion 70 is housed in the groove 62 by being sandwiched between the opposing portion 33 of the rivet member 30 and the extending portion 61 of the holder member 60.

Figure 8:
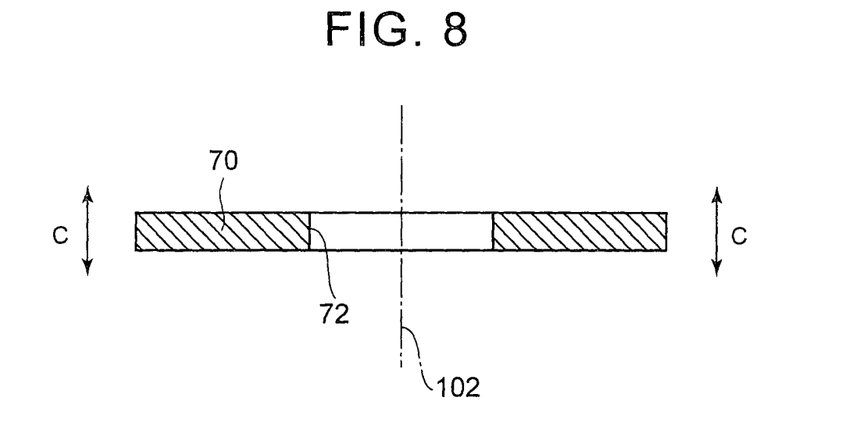
FIG. 8 is a sectional view of a state in which the heat accumulation portion is sandwiched between a rivet member and a holder member in the second step shown in FIG. 7.

As shown in FIG. 8, the heat accumulation portion 70 deforms in a flat plate shape by being sandwiched between the opposing portion 33 of the rivet member 30 and the extending portion 61 of the holder member 60. As a result, urging force from the heat accumulation portion 70 is applied as shown by arrow C, and the heat accumulation portion 70 urges the opposing portion 33 of the rivet member 30 in a direction away from the sealing body 25.

Figure 9:
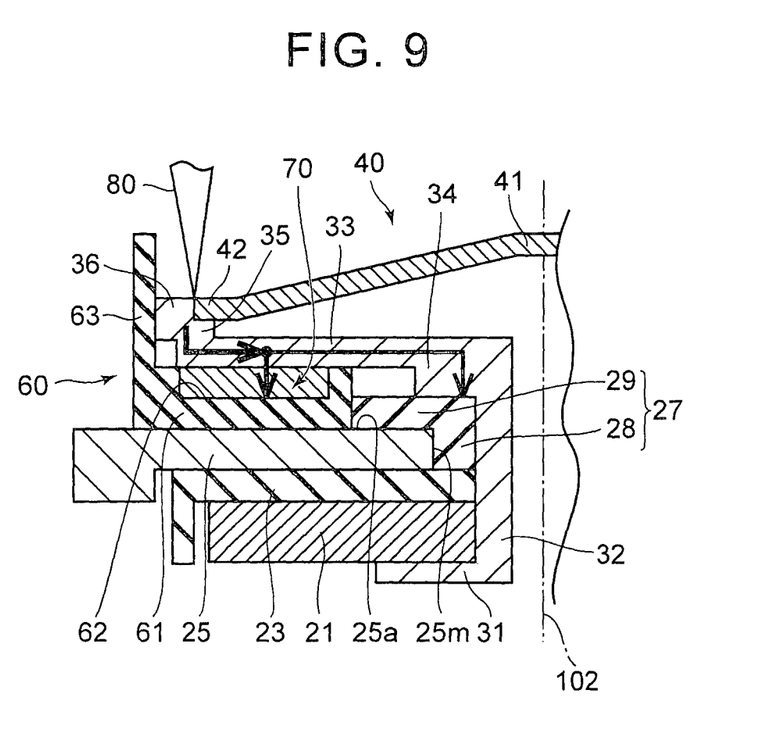
FIG. 9 is a view of a third step in the manufacturing method of the secondary battery according to the example embodiment of the invention.

Continuing on, as shown by FIG. 7 again, the reversing plate 40 is moved in the direction of arrow B in the drawing, and the outer peripheral edge 42 of the reversing plate 40 is arranged to the inside of the flange portion 36 of the rivet member 30. Next, as shown in FIG. 9, a laser light 80 is emitted near a boundary portion of the flange portion 36 and the outer peripheral edge 42. A weld is formed on the flange portion 36 and the outer peripheral edge 42, and the reversing plate 40 is welded to the rivet member 30. Next, the collector 51 is connected to the reversing plate 40. Accordingly, a current interrupt device provided in the secondary battery 100 is able to be manufactured.

Here, heat generated when welding the reversing plate 40 to the rivet member 30 is transferred to the gasket 27 via the rivet member 30. At this time, if the heat accumulation portion 70 is not arranged in a heat transfer path along which heat is transferred from the weld to the gasket 27, excess heat will end up being transferred to the gasket 27. As a result, the glass transition point of the material of the gasket 27 may be exceeded. In this case, the gasket may rupture or deform, reducing the sealability of the inside of the exterior body 10. Also, the elasticity of the gasket 27 may decrease from the effect of the heat, and the position of the rivet member 30 may change, which may result in the holder member 60 rattling and vibrating. This rattling may result in the current interrupt device activating erroneously.

In this example embodiment, the outer peripheral edge 42 of the reversing plate 40 is welded to the flange portion 36 of the rivet member 30 while the gasket 27 is in a state thermally contacting the rivet member 30, and the heat accumulation portion 70 that has a higher thermal conductivity (smaller specific heat capacity) than the rivet member 30 is in a state sandwiched between the opposing portion 33 of the rivet member 30 and the extending portion 61 of the holder member 60 so as to thermally contact the rivet member 30. Also, the heat accumulation portion 70 is arranged in the heat transfer path along which heat is transferred from the weld formed on the flange portion 36 and the outer peripheral edge 42 to the gasket 27.

Therefore, as shown by the arrows in FIG. 9, much of the heat generated when the reversing plate 40 is welded to the rivet member 30 is accumulated by the heat accumulation portion 70. As a result, the amount of heat that is transferred to the gasket 27 is reduced.

The heat accumulation portion 70 preferably has a large volume in order to accumulate more heat transferred from the rivet member 30. When using the rivet member 30 and the holder member 60 having dimensions such as those described above, the volume is preferably equal to or greater than 150 mm$^3$. For example, when the heat accumulation portion 70 is housed in the groove 62 and has taken on a flat plate shape, the outside diameter is preferably 18 mm, the inside diameter is preferably 8 mm, and the thickness is preferably 2 mm. Other than this, the outside diameter, the inside diameter, and the thickness may be changed as appropriate such that the volume will be equal to or greater than 150 mm$^3$, e.g., the outside diameter may be 16 mm, the inside diameter may be 8 mm, and the thickness may be 1.0 mm.

Having some of the heat generated at the time of welding be accumulated in the heat accumulation portion 70 makes it possible to prevent the temperature of the gasket 27 from reaching the glass transition point temperature of the material of the gasket 27. Consequently, the gasket is able to be prevented from rupturing as a result of the glass transition point temperature being exceeded. Also, creep rupture is also prevented when the gasket deforms from heat and time passes. As a result, with the secondary battery 100 according to this example embodiment, the inside of the exterior body 10 is able to be kept sufficiently airtight, and the reliability of the secondary battery is able to be improved.

Furthermore, the contact between the heat accumulation portion 70 and the opposing portion 33 is improved by using a disc spring that urges the opposing portion 33 of the rivet member 30 in a direction away from the sealing body 25 while housed in the groove 62, as the heat accumulation portion 70. As a result, thermal conductivity to the heat accumulation portion 70 improves, so the amount of heat that is transferred to the gasket 27 is able to be more effectively reduced.

In addition, as a result of the heat accumulation portion 70 urging the opposing portion 33 of the rivet member 30 in a direction away from the sealing body 25, rattling of the holder member 60 is able to be inhibited even if the opposing portion 33 of the rivet member 30 deforms in a direction away from the extending portion 61 of the holder member 60. The reason why this rattling is able to be inhibited will be described with reference to FIG. 1.

Figure 10:
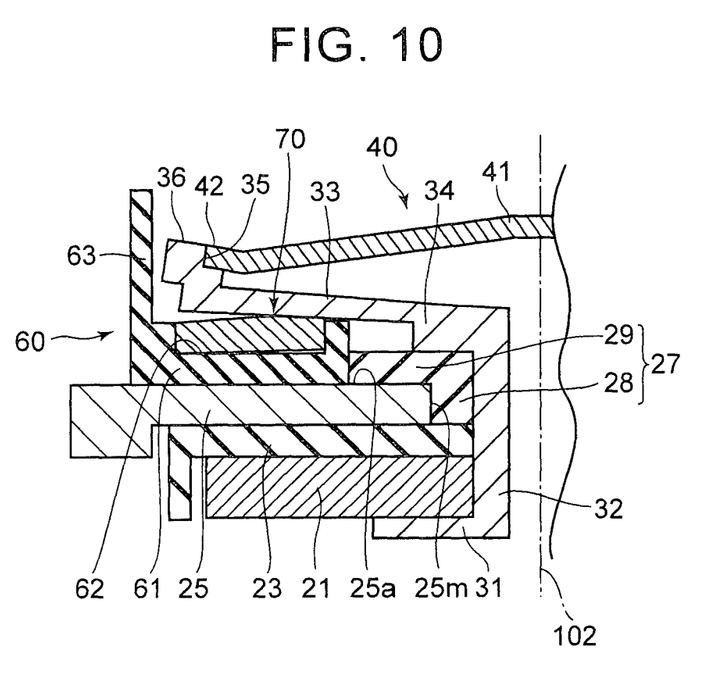
FIG. 10 is a sectional view of the state of the secondary battery when a load applied when a tip end portion of the rivet member is crimped is excessive.

If a load applied to the tip end portion of the small diameter portion 32 of the rivet member 30 becomes excessive when the tip end portion side of the small diameter portion 32 is crimped in a direction away from the central axis 102, the opposing portion 33 of the rivet member 30 will deform in a direction away from the extending portion 61 of the holder member 60.

Resin with small elastic deformation is used for holder member 60 from the viewpoint of the insulation properties and the like, so if the opposing portion 33 of the rivet member 30 deforms in a direction away from the extending portion 61 of the holder member 60, the holder member 60 will not deform following the deformation of the rivet member 30. Therefore, a gap is formed between the holder member 60 and the rivet member 30.

In this kind of case as well, the heat accumulation portion 70 will deform following the deformation of the opposing portion 33 of the rivet member 30, and will be sandwiched between the opposing portion 33 and the extending portion 61 of the holder member 60. Therefore, even if the urging force from the heat accumulation portion 70 acts on the rivet member 30 and the holder member 60 such that the holder member 60 and the rivet member 30 separate, a state in which the holder member 60 is fixed between the rivet member 30 and the sealing body 25 will be maintained. As a result, rattling of the holder member 60 is able to be inhibited, so erroneous activation of the current interrupt device due to rattling is able to be inhibited.

Also, a portion of the heat accumulation portion 70 thermally contacts the opposing portion 33 of the rivet member 30, so heat generated when welding the reversing plate 40 to the rivet member 30 is able to be accumulated by the heat accumulation portion 70. Therefore, the amount of heat that is transferred to the gasket 27 is able to be reduced. As a result, the inside of the exterior body 10 is able to be kept sufficiently airtight, and the reliability of the secondary battery 100 is able to be improved, just as described above.

There may be cases in which the property of the resin of which the gasket 27 is made decreases such that the urging force of the gasket 27 decreases, due to the gasket 27 being used over an extended period of time that is longer than expected. In this kind of case as well, rattling of the holder member 60 is able to be inhibited by the urging force from the heat accumulation portion 70 being applied.

As described above, using the secondary battery and the manufacturing method of the secondary battery according to this example embodiment enables the heat that is transferred to the gasket 27 that keeps the inside of the exterior body 10 airtight to be reduced, and the reliability to be improved.

In this example embodiment, a case is described in which the reversing plate 40 is formed by a disc spring, but the reversing plate 40 is not limited to this, and may also be formed by a ring member that has a flat plate shape. In this case as well, heat that has been transferred to the rivet member 30 is efficiently transferred to the heat accumulation portion 70 by the heat accumulation portion 70 thermally contacting the rivet member 30. As a result, the temperature of the gasket 27 is able to be inhibited from rising when the rivet member 30 and the reversing plate 40 are welded.

In this example embodiment, a case is described in which the heat accumulation portion 70 is housed in the groove 62 provided in the extending portion 61 of the holder member 60, but the heat accumulation portion 70 is not limited to this. That is, the groove 62 may not be provided, and the heat accumulation portion 70 may be sandwiched between the extending portion 61 of the holder member 60 and the opposing portion 33 of the rivet member 30. In this case as well, the heat from the rivet member 30 is efficiently transferred to the heat accumulation portion 70 by the heat accumulation portion 70 thermally contacting the rivet member 30. As a result, the temperature of the gasket 27 is able to be inhibited from rising when the rivet member 30 and the reversing plate 40 are welded.

When the heat accumulation portion 70 is housed in the groove 62, the height dimension of the current interrupt device is able to be prevented from increasing, so the height of the electrode body housed in the exterior body 10 is able to be prevented from decreasing. As a result, a decrease in the battery characteristics is able to be suppressed.

In this example embodiment, a case is described in which the current interrupt device is provided on the positive external terminal 24 side, but the current interrupt device is not limited to this. That is, the current interrupt device need only be provided on at least one of the positive external terminal 24 and the negative external terminal 20.

Next, a verification test performed to verify the effect of the invention will be described with reference to FIGS. 11 to 13. In the verification test, the rivet member 30 was formed using pure aluminum (A1050). The outer dimension of the rivet member 30 and the outer dimension of the holder member 60 used in the verification test were the same sizes as the rivet member 30 and the holder member 60 according to the example embodiment.

Figure 11:
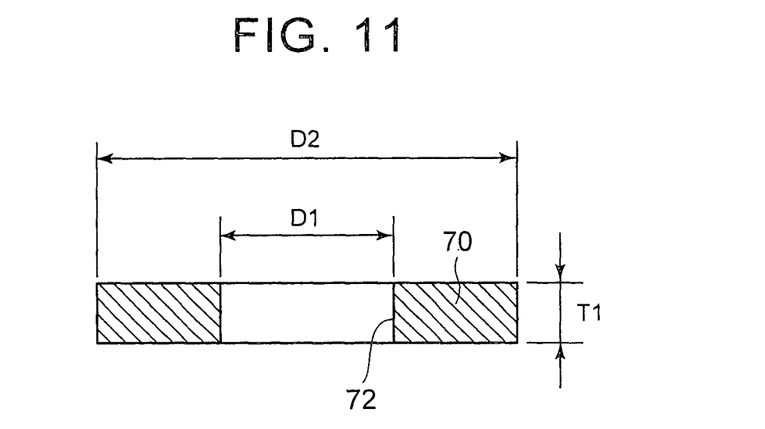
FIG. 11 is a view illustrating the size of the heat accumulation portion used in a verification test performed to verify the effect of the invention.

As shown in FIG. 11, in the verification test, a heat accumulation portion having a flat plate shape was used as the heat accumulation portion 70. Also, a variety of heat accumulation portions 70 having various inside diameters D1, outside diameters D2, thicknesses T1, and made of various materials, as shown in FIG. 12, were prepared as heat accumulation portions for Comparative Examples 2a to 4a, and Examples 1 to 10. Also, the volumes of the heat accumulation portions 70 were also changed, as shown in FIG. 12, by changing the inside diameter D1, the outside diameter D2, and the thickness T1 of the heat accumulation portions 70. In Comparative Example 1a, the heat accumulation portion 70 was not provided.

As the holder members 60 for Comparative Examples 2a to 4a and Examples 1 to 10, a holder member provided with the groove 62 corresponding to the heat accumulation portion for each of Comparative Examples 2a to 4a and Examples 1 to 10 was prepared. In Comparative Example 1a, a groove was not provided in the holder member 60.

Secondary batteries were manufactured by a manufacturing method according to the manufacturing method of the secondary battery of the example embodiment in Comparative Examples 1a to 4a and Examples 1 to 10, and the temperatures of the gaskets 27 when welding the rivet member 30 and the reversing plate 40 were measured. The laser output when welding the rivet member 30 and the reversing plate 40 was adjusted such that the heat input would be 150 W. The secondary batteries were manufactured such that the activation pressure of the current interrupt device would be 0.75 MPa.

The gaskets 27 were formed using PFA. The glass transition temperature of the PFA is approximately 130 degrees. Therefore, it is preferable that the temperatures of the gaskets 27 during welding be no higher than 120° C. so as not to exceed the glass transition temperature.

(Test Results)

Figure 12:
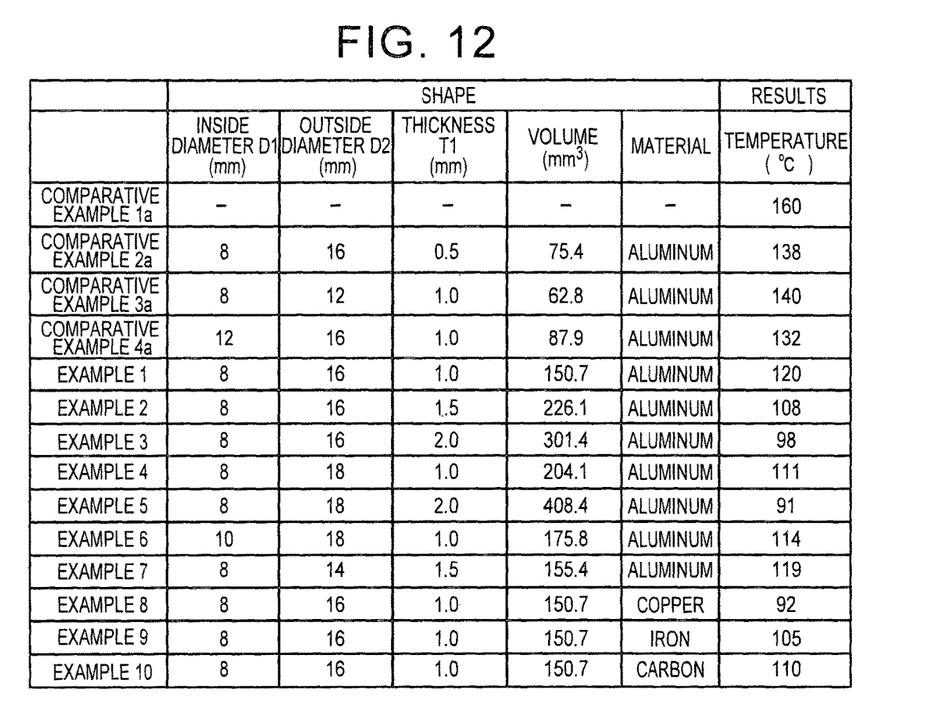
FIG. 12 is a view illustrating the conditions and results of the verification test performed to verify the effect of the invention.
Figure 13:
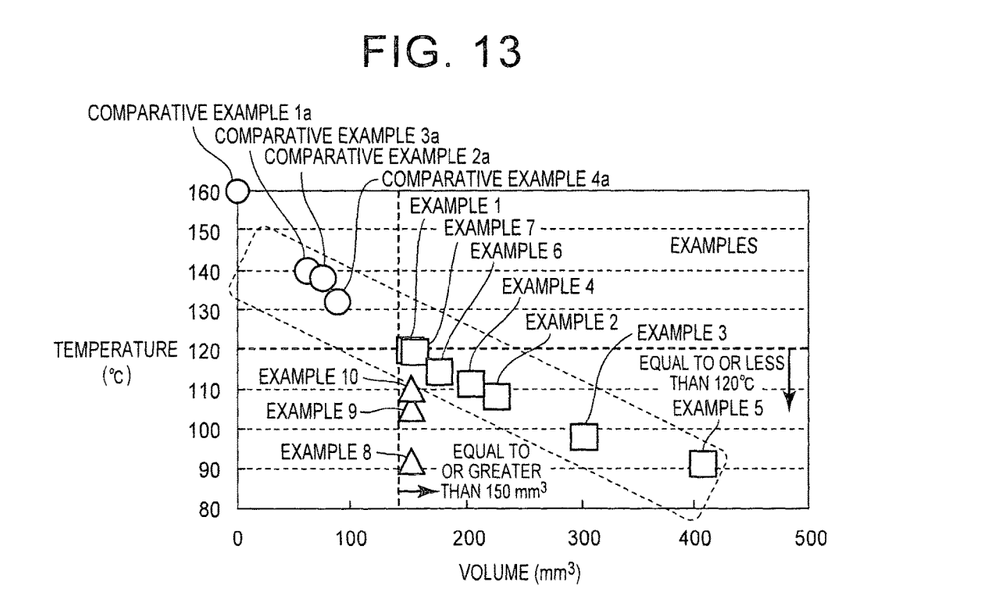
FIG. 13 is a view illustrating the results of the verification test performed to verify the effect of the invention.

As shown in FIGS. 12 and 13, in Comparative Examples 1a to 4a, the temperatures of the gaskets 27 during welding were all higher than 130° C., and higher than the glass transition temperature of PFA. However, in Examples 1 to 10, the temperatures of the gaskets 27 were all lower than 130° C., and lower than the glass transition temperature of PFA.

When comparing Comparative Examples 2a to 4a and Examples 1 to 10 with Comparative Example 1 a, the temperature of the gasket 27 during welding was lower when the heat accumulation portion 70 is provided than it was when the heat accumulation portion 70 is not provided. Furthermore, when comparing each of Comparative Examples 2a to 4a and Examples 1 to 10, the temperature of the gasket 27 during welding decreases as the volume increases when the heat accumulation portion 70 is made of aluminum. Thus, it was confirmed that there is a proportional relationship between the volume of the heat accumulation portion 70 and the temperature of the gasket 27 during welding. When the heat accumulation portion 70 is made of aluminum and the volume of the heat accumulation portion 70 is equal to or greater than 150 mm$^3$, the temperatures of the gaskets 27 during welding were all equal to or less than 120° C., and lower than the glass transition temperature of PFA.

When comparing Examples 7 to 10, when the volume of the heat accumulation portion 70 is constant and only the material is changed, it was confirmed that the temperature of the gasket 27 changes due to the thermal conductivity and specific heat capacity of each material. It was confirmed that the temperature of the gasket 27 during welding is able to be reduced more with material having a lower specific heat capacity and a higher thermal conductivity.

From these results, it can be said that it was experimentally demonstrated that heat generated when welding the reversing plate to the rivet member is able to be accumulated in the heat accumulation portion, so the amount of heat transferred to the gasket via the rivet member 30 is able to be reduced, by having the heat accumulation portion 70, which thermally contacts the rivet member 30 and has a higher thermal conductivity (has a smaller specific heat capacity) than the rivet member 30, be sandwiched between the opposing portion 33 of the rivet member 30 and the extending portion 61 of the holder member 60. Moreover, it can also be said that it was experimentally demonstrated that the temperature of the gasket 27 during welding is able to be reliably reduced by having the volume of the heat accumulation portion 70 be equal to or greater than 150 mm$^3$.

While example embodiments and examples of the invention have been described above, these example embodiments and examples are in all respects merely exemplary and should in no way be construed as limiting. For example, instead of providing the extending portion 61 of the holder member 60 between the gasket 27 and the heat accumulation portion 70, a structure such as that described below may be employed. When welding the reversing plate 40 to the rivet member 30, sufficient space may be provided between the heat accumulation portion 70 and the gasket 27, or an insulating member that is different from the holder member 60 may be provided between the heat accumulation portion 70 and the gasket 27, so that the amount of heat transferred from the weld to the gasket 27 via the heat accumulation portion 70 is less than the amount of heat transferred from the weld directly to the gasket 27 via the rivet member 30. Also, the flange portion 29 of the gasket 27 may be provided on the upper side of the sealing body 25 instead of the lower side of the sealing body 25, and the inside diameter of the extending portion 61 of the holder member 60 may be the same size as the outside diameter of the step portion 34 of the rivet member 30.

The invention claimed is:

1. A secondary battery provided with a current interrupt device that interrupts a flow of current between a battery element and an external terminal provided outside of an exterior body within which the battery element is housed, when an internal pressure of the exterior body rises, comprising:
    a sealing body that is arranged in an open portion provided in the exterior body;
    a rivet member that is electrically connected to the external terminal, and passes through a through-hole provided in the sealing body and extends into the exterior body;
    a gasket that thermally contacts the rivet member, and is fixed in a state compressed and deformed between the sealing body and the rivet member;
    a holder member that retains a collector member that is connected to the battery element inside the exterior body;
    a reversing plate that is connected to the rivet member and the collector member, and deforms away from the collector member and toward the rivet member when the internal pressure of the exterior body rises; and
    a heat accumulation portion that thermally contacts the rivet member and has a thermal conductivity equal to or greater than the thermal conductivity of the rivet member,
    wherein the rivet member includes an opposing portion that faces the sealing body from a distance inside the exterior body, and a peripheral edge portion that is positioned on a peripheral edge of the opposing portion;
    the holder member includes an extending portion that is arranged sandwiching the gasket on a side opposite the through-hole, and extends toward the gasket;
    an outer peripheral edge of the reversing plate is connected by welding to the peripheral edge portion of the rivet member; and
    the heat accumulation portion is sandwiched between the opposing portion of the rivet member and the extending portion of the holder member.

2. The secondary battery according to claim 1, wherein the extending portion of the holder member has a groove that opens toward the opposing portion of the rivet member; and
    the heat accumulation portion is housed in the groove.

3. The secondary battery according to claim 2, wherein the heat accumulation portion is a disc spring; and
    the heat accumulation portion urges the opposing portion of the rivet member in a direction away from the sealing body, while housed in the groove.

4. A manufacturing method of a secondary battery provided with a current interrupt device that interrupts a flow of current between a battery element and an external terminal provided outside of an exterior body within which the battery element is housed, when an internal pressure of the exterior body rises, comprising:
    a first step of preparing a sealing body;
    a second step of placing a gasket and a holder member on the sealing body;
    a third step of placing a heat accumulation portion on a first surface of the holder member, the first surface being on an opposite side of the holder member from a second surface of the holder member, on which the sealing body is arranged;

a fourth step of inserting one end side of a rivet member that is electrically connected to the external terminal through a through-hole provided in the sealing body from a side on which the heat accumulation portion is positioned, and fixing the heat accumulation portion, the holder member, and the gasket in place by sandwiching the heat accumulation portion, the holder member, and the gasket between the rivet member and the sealing body;

a fifth step of welding a reversing plate that deforms away from a collector member and toward the rivet member when the internal pressure of the exterior body rises, to the rivet member to form an assembly including the sealing body, the gasket, the holder member, the heat accumulation portion, the rivet member and the reversing plate; and a sixth step of assembling the assembly to the exterior body such that the reversing plate is arranged inside of the exterior body, and wherein in the second step, the holder member is arranged sandwiching the gasket on a side opposite the through-hole;

the heat accumulation portion has a thermal conductivity equal to or greater than the thermal conductivity of the rivet member;

the holder member includes an extending portion that extends toward the gasket;

the rivet member includes an opposing portion that opposes the sealing body from a distance inside the exterior body, and a peripheral edge portion that is positioned on a peripheral edge of the opposing portion;

in the fourth step, the gasket thermally contacts the rivet member, and is fixed in a state compressed and deformed between the sealing body and the rivet member, the heat accumulation portion being sandwiched between the opposing portion of the rivet member and the extending portion of the holder member; and in the fifth step, an outer peripheral edge of the reversing plate is welded to the peripheral edge portion of the rivet member, while the gasket is thermally contacting the rivet member, and the heat accumulation portion is thermally contacting the rivet member, and the heat accumulation portion is sandwiched between the opposing portion of the rivet member and the extending portion of the holder member.

5. The manufacturing method according to claim 4, wherein the extending portion of the holder member has a groove that opens toward the opposing portion of the rivet member;

in the third step, the heat accumulation portion is housed in the groove.

6. The manufacturing method according to claim 5, wherein a disc spring that urges the opposing portion of the rivet member in a direction away from the sealing body while housed in the groove, is used as the heat accumulation portion.

* * * * *